Dec. 7, 1948.  C. F. COBB ET AL  2,455,560
METHOD OF ARRANGING AND BRAZING
SUPERPOSED COMMUTATOR LEADS
Filed Aug. 6, 1945

Inventors
Carroll F. Cobb
Edward F. Brill
John R. Guenther
by Didier Journeaux
Attorney Patented Dec. 7, 1948

2,455,560

UNITED STATES PATENT OFFICE 2,455,560

METHOD OF ARRANGING AND BRAZING SUPERPOSED COMMUTATOR LEADS

Carroll F. Cobb, Silverton, Ohio, Edward F. Brill, Milwaukee, Wis., and John R. Guenther, Chicago, Ill., assignors to Allis-Chalmers Manufacturing Company, Milwaukee, Wis., a corporation of Delaware Application August 6, 1945, Serial No. 609,186

7 Claims. (Cl. 219—12)

This invention relates in general to commutators and methods of making the same, and more particularly to an arrangement of commutator leads which permits brazing the leads in the slots of the commutator bars without damaging the commutator insulation.

In dynamoelectric machines of the commutator type, each commutator bar is generally connected to the armature winding through two leads or through two groups of parallel leads disposed one above the other in axial alignment with the bar. The different pairs of leads are disposed symmetrically around the armature shaft and, in general, the distance from the outer surface of the upper leads to the armature axis is greater than the radius of the commutator cylindrical area engaged by the brushes. Each commutator bar is therefore provided with a neck or riser of increased height which is slotted to receive the ends of the associated leads. Both leads generally extend through the neck and reach the step in the cylindrical outer surface of the commutator where both are accessible for the application of heat for soldering or brazing them in the bar.

Sometimes, however, the lower lead is embedded in the commutator bar below the level of the brush engaging area and is entirely inaccessible. Heat then can be transmitted to the lower lead only by conduction through the associated upper lead and through the adjacent portions of the commutator bar. Satisfactory soldering of the leads then requires the exercise of considerable care, and to braze the leads it is necessary to heat the commutator neck for a considerable length of time to temperatures far above the melting point of the brazing metal, thereby causing the commutator insulation to become damaged to an extent sufficient to impair its effectiveness.

In making the latter type of commutator, it is therefore advantageous to provide each lower lead with a bent end portion extending to the cylindrical outer surface of the commutator in axial alignment with the associated upper lead so that both leads are accessible for direct heating thereof. In addition, it is advantageous to provide the lower lead or the upper lead or both leads with an extension protruding from the surface of the commutator, whereby additional heat supplied to the extension is conducted to the embedded part of the lead to accelerate the fusion of the brazing metal. This arrangement is particularly convenient when the lead ends are heated by induction, the protruding extension then being inserted in the inductor coil serving to induce currents in the lead and in the adjacent portions of the commutator bar.

It is therefore an object of the present invention to provide an improved method of making a commutator to obtain that the lower and upper leads all reach the cylindrical outer surface of the commutator.

Another object of the present invention is to provide an improved method of making a commutator having a cylindrical outer surface in such manner that the lead ends may be heated by induction for brazing thereof in the slots of the commutator bars.

Another object of the present invention is to provide a method of brazing commutator leads embedded adjacent the cylindrical outer surface of a commutator without damage to the commutator insulation.

Another object of the present invention is to provide a method of brazing commutator leads by supplying heat directly to the embedded part of the leads and to the adjacent portions of the commutator bar and also supplying heat indirectly thereto by conduction from a heated element protruding from the commutator surface.

Objects and advantages other than those above set forth will be apparent from the following description when read in connection with the accompanying drawing, in which.

Figure 3:
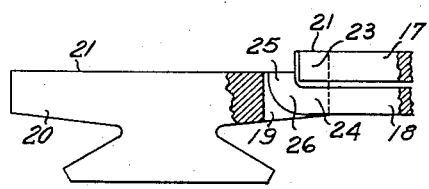
Figure 4:
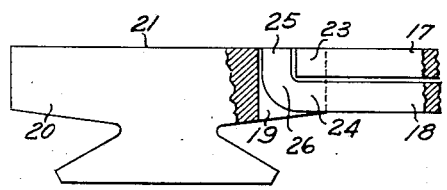

Fig. 3 is a view partly in elevation and partly in cross section of another embodiment of finished commutator bar with the two lead end portions extending to different steps of the commutator outer cylindrical surface; and Fig. 4 is a view partly in elevation and partly in cross section of a further embodiment of finished commutator bar having a stepless outer cylindrical surface to which the ends of the leads extend in axial alignment.

Figure 1:
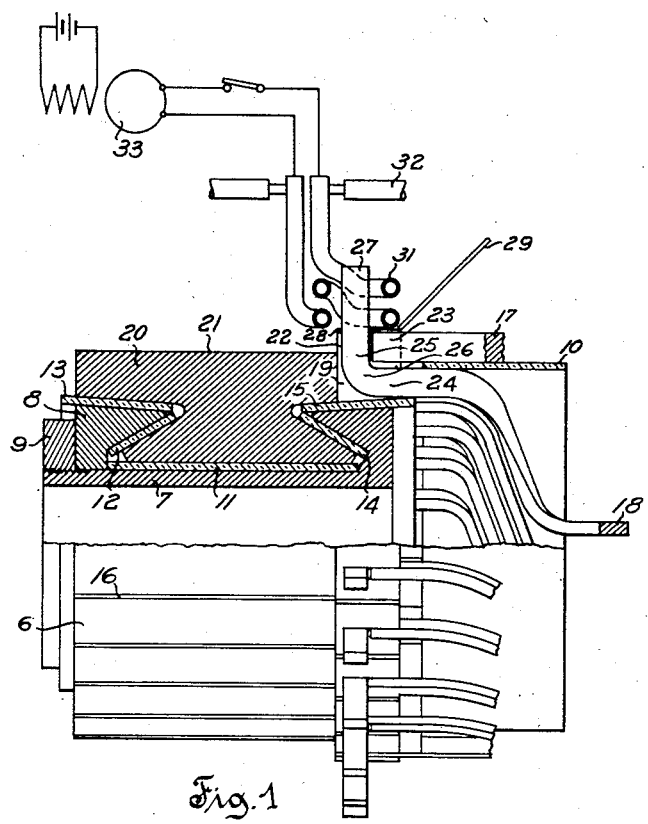
Fig. 1 is a view partly in elevation and partly in longitudinal cross section of a commutator showing a pair of leads disposed for brazing in accordance with the present invention.

Referring more particularly to the drawing by characters of reference, Fig. 1 shows a commutator comprising a plurality of bars or segments 6, each bar being provided with the usual dovetail portion for holding the bars in a unitary assembly. The bars are mounted on a sleeve 7 to which they are fastened by means of a suitably shaped ring 8 backed by a nut 9. The bars are insulated from the sleeve assembly by means of an insulating tube 11 and of two pair of conical insulation rings 12, 13, 14, 15. The different bars are insulated from each other by means of laminated insulating segments 16. All the insulating material incorporated in the commutator may be of any known type used for that purpose and generally consists of mica splittings united by means of an organic binder. The latter type of insulation is not seriously affected by momentary heating to the melting point of metals or alloys commonly used in brazing operations but would be excessively damaged by heating to substantially higher temperatures for a substantial length of time.

Fig. 1 shows the commutator disposed for brazing a pair of leads 17, 18 to the slot 19 of a commutator bar 20 shown in cross section. It will be observed that the outer cylindrical surface 21 of the commutator is stepped, whereby commutator bar 20 is caused to present a neck portion 22 wherein slot 19 is provided. As may be seen in the lower part of Fig. 1 each slot has substantially the same width as the lead embedded therein, leaving only sufficient clearance for the formation of a film of brazing metal between the leads and the walls of the slots. A sheet of flexible mica 10 insulates each upper lead from the adjacent lower leads which are at different potentials.

The step of surface 21 is of such height that any portion of lower lead 18 disposed below the embedded portion 23 of lead 17 is inaccessible for the direct supply of heat thereto. Lead 18 is formed with intermediate portion 24 adapted to be embedded in slot 19 and a bent end portion. For brazing leads 17, 18 in slot 19 the intermediate portion 24 of lead 18 is embedded in the bottom portion of slot 19 and portion 23 of lead 17 is embedded in the portion of slot 19 extending between the portion 24 and the surface 21. The end portion of lead 18 may be considered to comprise a portion 25 directed perpendicularly to surface 21 and embedded in the portion of slot 19 adjacent surface 21, and a bend 26 joining portions 24 and 25.

Prior to the brazing operation, lead 18 may be cut flush with surface 21. It is however more advantageous to provide lead 18 with an extension 27 protruding from slot 19 above surface 21. The accessible surfaces of the lead ends and the adjacent surfaces of bar 20 are coated with a suitable flux 28 and a rod of brazing metal 29 is brought in contact with a convenient point of the parts to be brazed. The brazing connection may be effected using a variety of known brazing metal compositions, and in particular satisfactory results have been consistently obtained by using an alloy of 50% silver, 15½% copper, 16½% zinc and 18% cadmium with a flux having a borax base with addition of alkali bifluorides or other halogen salts.

The lead portions 23, 25, 27 and the adjacent portions of neck 22 may then be heated in any suitable known manner to bring them rapidly to a substantially uniform temperature slightly above the fusion temperature of rod 29. In the preferred method, an inductor coil 31 is disposed in inductive relation with respect to lead portions 23, 25, 27 and the adjacent portions of neck 22. It is generally necessary to provide coil 31 with artificial cooling means and the coil is accordingly formed of metal tubing connected with a suitable water supply pipe 32. When coil 31 has been properly disposed with respect to the commutator either by moving the coil toward the commutator or by moving the commutator toward the coil, the latter is connected with a source of alternating current 33 of any suitable type conventionally represented on the drawing as a synchronous generator.

The current supplied to coil 31 is caused to be of such intensity, frequency and duration as to induce in the superficial parts of lead portions 23, 25 and of the adjacent portions of neck 22 currents which heat such parts rapidly to a substantially uniform temperature slightly above the fusion temperature of rod 29. Heat conducted from the heated parts to the flux and to rod 29 causes the metal of the rod to melt and to unite leads 17, 18 with neck 22. Additional current induced in protruding lead portion 27 likewise heats the latter, and the heat produced therein flows into the embedded part of lead 18 to accelerate the fusion of the brazing metal and to assist in maintaining the brazing metal above its fusion temperature while it is flowing between the leads and the walls of slot 19.

It will be understood that the intensity and duration of the flow of current through coil 31 and the location of coil 31 will very with each particular arrangement of commutator leads and must be determined experimentally in every instance to insure that the portions of the commutator bar adjacent to insulation are not heated to such temperature and for such length of time as to cause the insulation to become damaged. For example, brazing of leads having a cross section of ⅛ inch by ¼ inch may be effected by the use of a 20 kilowatt generator supplying 375 kilocycle current to the inductor during approximately 11 seconds. To avoid overheating of the insulation, it is generally advantageous and frequently essential to provide the commutator bar being brazed with artificial cooling means during the brazing operation.

As soon as the desired amount of melted brazing metal has run into slot 19 to unite leads 17, 18 with neck 22, the current in coil 31 is interrupted and the coil is removed from engagement with extension 27. The different commutator bars are brazed one after the other in the above described manner.

The induction of heating current in extension 27 causes the flow of heating current in the other portions of the assembly to be reduced to an extent which varies with the length of extension 27. The latter length should therefore be so selected that the heat which flows from extension 27 into the embedded portion of lead 18 during the brazing operation is greater than the decrease in heat generated in the embedded parts and the adjacent portions of the commutator bar.

The above described procedure may be varied to suit particular arrangements of leads. For instance coil 31 may first be disposed about the end of extension 27 to preheat the extension without substantially raising the temperature of neck 22, the coil thereafter being disposed in close proximity to neck 22 as shown in Fig. 1 to complete the brazing operation. Depending on the dimensions of the parts to be brazed, the entire brazing operation may even be performed with coil 31 inducing heating current substantially only in extension 27.

In some instances it may be preferable to omit extension 27 and to provide instead an extension on upper lead 17. Both leads may also be provided with such extensions, coil 31 then being increased in size to the necessary extent to permit disposing the coil about the two extensions.

Figure 2:
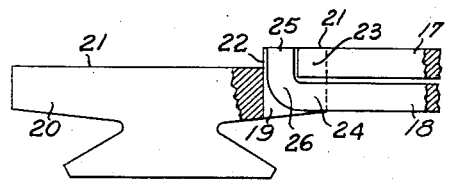
Fig. 2 is a view partly in elevation and partly in cross section of one embodiment of finished commutator bar with the two lead end portions extending to a step of the commutator outer cylindrical surface.

When brazing of all the commutator bars is completed, the protruding extensions may be left in place and may be twisted for assisting in ventilating the commutator. In general however the extensions are removed and the commutator is machined to its final dimensions. If the outer surface 21 of the commutator is stepped between the brush engaging area and the bent portion of lead 18, each finished commutator bar has the outline shown in Fig. 2. The commutator outer surface may also be stepped at the end of lead 17, the finished commutator bar then having the outline shown in Fig. 3. The commutator outer surface may also be made stepless as shown in Fig. 4.

Although but a few embodiments of the present invention have been shown and described, it will be apparent to those skilled in the art that various changes and modifications may be made therein without departing from the spirit of the invention or from the scope of the appended claims.

It is claimed and desired to secure by Letters Patent:

1. The method of making a commutator comprising the steps of providing a lower lead with a bent end portion, embedding said lower lead in the slot of a commutator bar with said end portion extending at least to the outer surface of said commutator bar, embedding an upper lead end portion in the portion of said slot extending between said lower lead and said surface, applying flux and fusible metal to said lead end portions, and heating said lead end portions and the adjacent portions of said commutator bar above the fusion temperature of said metal.

2. The method of making a commutator comprising the steps of providing a lower lead with a bent end portion, embedding said lower lead in the slot of a commutator bar with said end portion extending at least to the outer surface of said commutator bar, embedding an upper lead end portion in the portion of said slot extending between said lower lead and said surface, applying flux and fusible metal to said lead end portions, and inducing in the superficial portions of said lead end portions and in the adjacent portions of said commutator bar electric currents heating said lead end portions and the adjacent portions of said commutator bar to a substantially uniform temperature slightly above the fusion temperature of said metal.

3. The method of making a commutator comprising the steps of providing a lower lead with a bent end portion, embedding an intermediate portion of said lower lead in a portion of the slot of a commutator bar remote from the commutator cylindrical outer surface with said bent end portion partially protruding from said surface, embedding an upper lead end portion in the portion of said slot extending between said lower lead intermediate portion and said surface, applying flux and fusible metal to said lead end portions, supplying heat to the superficial portions of the embedded parts of said leads and of the adjacent part of said commutator bar to cause fusion of said metal for uniting said lead end portions with said commutator bar, and supplying to said protruding lower lead end portion additional heat flowing into the embedded part of said lower lead end portion to accelerate the fusion of said metal.

4. The method of making a commutator comprising the steps of providing a lower lead with a bent end portion, embedding an intermediate portion of said lower lead in a portion of the slot of a commutator bar remote from the commutator cylindrical outer surface with said bent end portion partially protruding from said surface, embedding an upper lead end portion in the portion of said slot extending between said lower lead intermediate portion and said surface, applying flux and fusible metal to said lead end portions, inducing in the superficial portions said lead end portions and in the adjacent portions of said commutator bar electric currents heating said lead end portions and the adjacent portions of said commutator bar to a substantially uniform temperature slightly above the fusion temperature of said metal, and inducing in said protruding lower lead end portion additional current supplying additional heat flowing into the embedded part of said lower lead end portion to accelerate the fusion of said metal.

5. The method of making a commutator comprising the steps of embedding a lead structure in the slot of a commutator bar adjacent an outer surface of the commutator, applying flux and fusible metal to said lead structure, and inducing in the superficial portions of said lead structure and of the adjacent portions of said commutator bar electric currents heating said lead structure and the adjacent portions of said commutator bar to a substantially uniform temperature slightly above the fusion temperature of said metal.

6. The method of making a commutator comprising the steps of embedding a lead structure in the slot of a commutator bar adjacent an outer surface of the commutator, disposing an element of said lead structure to protrude from said slot above the said surface, applying flux and fusible metal to said lead structure, inducing in the superficial portions of said lead structure and of the adjacent portions of said commutator bar electric currents heating said lead structure and the adjacent portions of said commutator bar to a substantially uniform temperature slightly above the fusion temperature of said metal, and inducing in said protruding element additional current supplying additional heat flowing into the embedded part of said element to accelerate the fusion of said metal.

7. The method of making a commutator comprising the steps of embedding a lead structure in the slot of a commutator bar adjacent an outer surface of the commutator, disposing an element of said lead structure to protrude from said slot above the said surface, applying flux and fusible metal to said lead structure, supplying heat to the superficial portions of the embedded part of said lead structure and of the adjacent parts of said commutator bar to cause fusion of said metal for uniting said lead structure with said commutator bar, and supplying to said protruding element additional heat flowing into the embedded part of said lead structure to accelerate the fusion of said metal.

CARROLL F. COBB.
EDWARD F. BRILL.
JOHN R. GUENTHER.

(References on following page)

REFERENCES CITED

The following references are of record in the file of this patent:

UNITED STATES PATENTS

| Number | Name | Date |
|---|---|---|
| 984,655 | Fisher | Feb. 21, 1911 |
| 2,237,309 | McMinn | Apr. 8, 1941 |
| 2,251,326 | Cullin | Aug. 5, 1941 |
| 2,295,409 | Kreh | Sept. 8, 1942 |
| 2,351,021 | Dick | June 13, 1944 |
| 2,357,111 | Hemphill | Aug. 29, 1944 |
| 2,379,145 | Graybrook | June 26, 1945 |
| 2,400,902 | Allen | May 28, 1946 |

OTHER REFERENCES

Bulletin 12A (1943), Handy & Harman, New York, New York, pages 3, 4 and 15–17. (Copy in Division 60).